United States Patent [19]
Kohl

[11] Patent Number: 5,377,817
[45] Date of Patent: Jan. 3, 1995

[54] BI-DIRECTIONAL ACCUMULATION ROLLER CONVEYOR

[75] Inventor: Robert E. Kohl, Duxbury, Mass.

[73] Assignee: Jervis B. Webb Company, Farmington Hills, Mich.

[21] Appl. No.: 173,774

[22] Filed: Dec. 22, 1993

[51] Int. Cl.$^6$ .............................................. B65G 13/06
[52] U.S. Cl. ................................................... 198/781
[58] Field of Search ............... 198/780, 781, 789, 790, 198/580, 465.1

[56] References Cited

U.S. PATENT DOCUMENTS

| | | | |
|---|---|---|---|
| 1,614,481 | 1/1927 | York | 198/790 |
| 3,513,960 | 5/1970 | Adams. | |
| 3,650,373 | 3/1972 | Kern et al. | 198/580 X |
| 4,572,353 | 2/1986 | Felder | 198/781 X |
| 4,927,005 | 5/1990 | Sirefelt | 198/781 |

*Primary Examiner*—James R. Bidwell
*Attorney, Agent, or Firm*—Joseph W. Farley

[57] ABSTRACT

A bi-directional accumulation roller conveyor includes a plurality of upper load carrying rollers longitudinally coextensive with and superimposed over a plurality of lower load carrying rollers, a drive for driving the upper and lower load carrying rollers for counter rotation with respect to each other, a first clutch for drivingly engaging the upper load carrying rollers, a second clutch for drivingly engaging the lower load carrying rollers, a actuator for disengaging the clutches respectively in response to the presence of a pallet on each terminal end of the upper or lower plurality of load carrying rollers and a lifting device for transferring pallets between the upper and lower load carrying rollers thereby providing a continuous loop of conveyable pallets and managing pallet flow.

12 Claims, 5 Drawing Sheets

BI-DIRECTIONAL ACCUMULATION ROLLER CONVEYOR

TECHNICAL FIELD

This invention relates generally to accumulation roller conveyor systems and more particularly to a slave pallet system including a bi-directional over-and-under accumulation roller conveyor adapted to handle palletized loads and function as a pallet dispenser and collector.

BACKGROUND ART

Accumulation roller conveyors have been available in various forms in which conveyor sections stop as loads come to the end of the conveyor and accumulate before being removed. One known prior system of this type has included successive sections, each with a set of load supporting rolls and each section provided with an actuating roller adapted to respond to the presence of a load. The actuating roller, when depressed by the presence of the load, declutches the drive to that set of rollers and simultaneously conditions the mechanism for a preceding section to declutch its drive mechanism when a load passes thereon. If no load is present on the first mentioned section, the drive mechanism will continue to provide positive driving action and the preceding drive system will also continue even though a load passes over it.

In connection with known accumulation roller conveyors used in slave pallet systems wherein loads are palletized on reusable pallets, it has been necessary to employ separate mechanisms for dispensing slave pallets to the accumulation roller conveyor and also for collecting slave pallets from the accumulation roller conveyor. Empty slave pallets are stacked in a separate device and returned to the input point where they are dispensed as needed. Such systems require a surplus of pallets and often times there is either a glut of pallets at one of the mechanisms or one of the mechanisms is starved for pallets.

DISCLOSURE OF INVENTION

An object of the present invention is to provide a bi-directional accumulation roller conveyor that improves the conveyability of pallet loads.

Another object of the present invention is to provide a bi-directional accumulation roller conveyor that manages pallet flow.

A further object of the present invention is to provide a bi-directional accumulation roller conveyor that functions as a pallet dispenser and pallet collector.

Still another object of the present invention is to provide a bi-directional accumulation roller conveyor having over and under conveyor rollers driven by a single conveyor drive for the recirculating conveyance of pallets in two directions.

In carrying out the above objects and other objects of the invention, a bi-directional accumulation roller conveyor includes a frame structure including a pair of longitudinally extending transversely connected side frames. A first plurality of parallel upper load carrying rollers is supported between the side frames and are arranged in a series of successive upper groups. Each of the upper groups has a driving connection between the rollers. A second plurality of parallel lower load carrying rollers is supported between the side frames below the upper load carrying rollers. The lower load carrying rollers are arranged in a series of successive lower groups and each group has a driving connection between the rollers of that group.

A single drive unit supported by the frame structure is drivingly connected through a drive transmission to each of the upper groups of rollers and to each of the lower groups of rollers for driving the rollers of the upper groups in one direction of rotation and for driving the rollers of the lower groups in the opposite direction of rotation whereby articles supported on the upper load carrying rollers are conveyable by successive upper groups to a terminal upper group at one end of the conveyor and articles supported on the lower load carrying rollers are conveyable by successive lower groups to a terminal lower group at the opposite end of the conveyor. The drive transmission includes, for each of the series of upper and lower groups, a respective series of upper and lower drive trains. Each drive train includes a clutch for selective engagement and disengagement of the drive transmission.

Upper and lower accumulation members disengage the clutch of the respective drive trains of the upper groups and the lower groups of rollers in response to the presence of an article on each of the terminal upper and terminal lower groups of rollers and on successive groups upstream from each of the terminal upper and lower groups.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
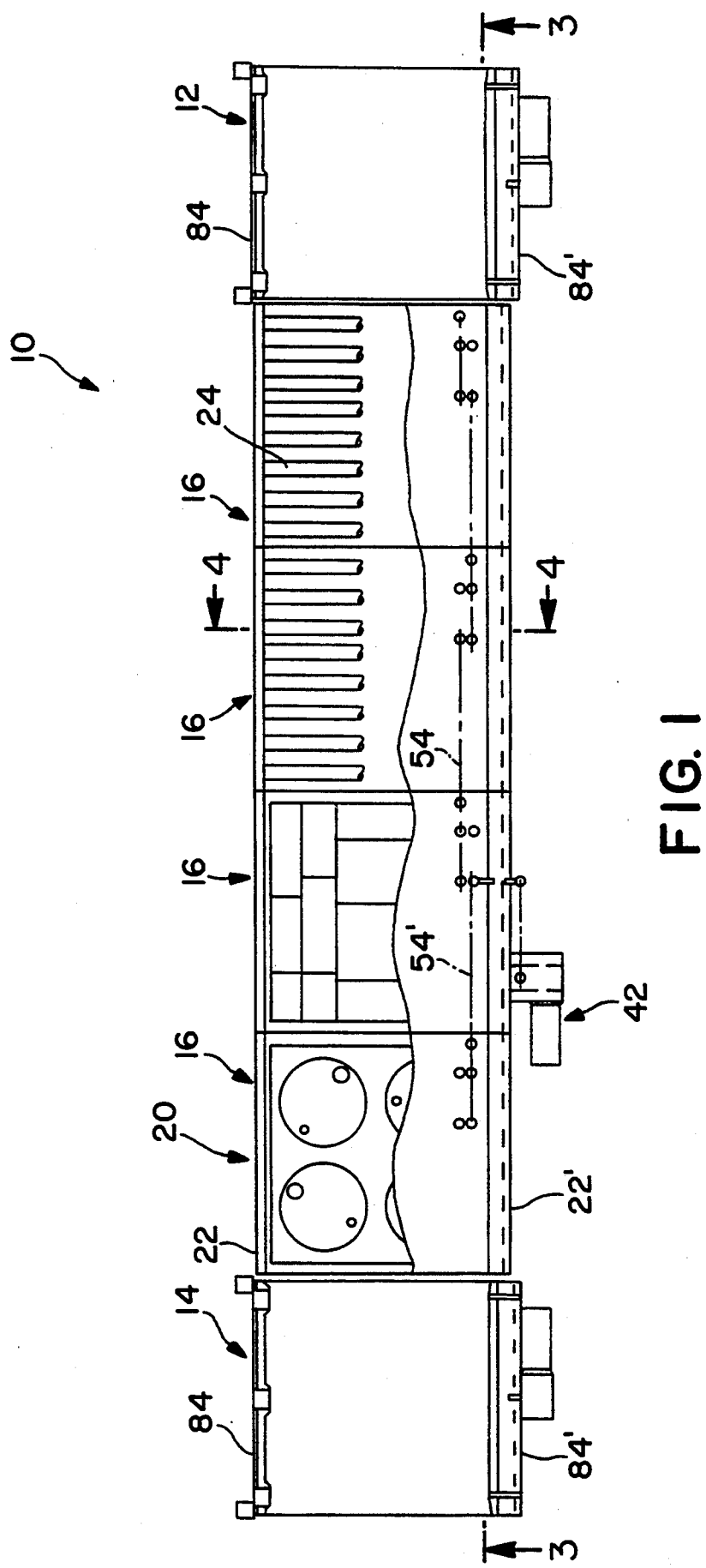
FIG. 1 is a plan view of a bi-directional over and under accumulation roller conveyor constructed in accordance with the present invention.

With reference to FIGS. 1—5, an accumulation roller conveyor is generally referred to by reference numeral 10 and is used to convey pelletized loads between combination loading and unloading stations 12 and 14. As is hereinafter more fully described accumulation roller conveyor 10 is a bi-directional over and under accumulation roller conveyor that improves the conveyability of pelletized loads, managing pallet dispensing and collecting, by conveying pallets in an endless loop thereby eliminating the need for independent pallet dispensing and collecting mechanisms.

Figure 2:
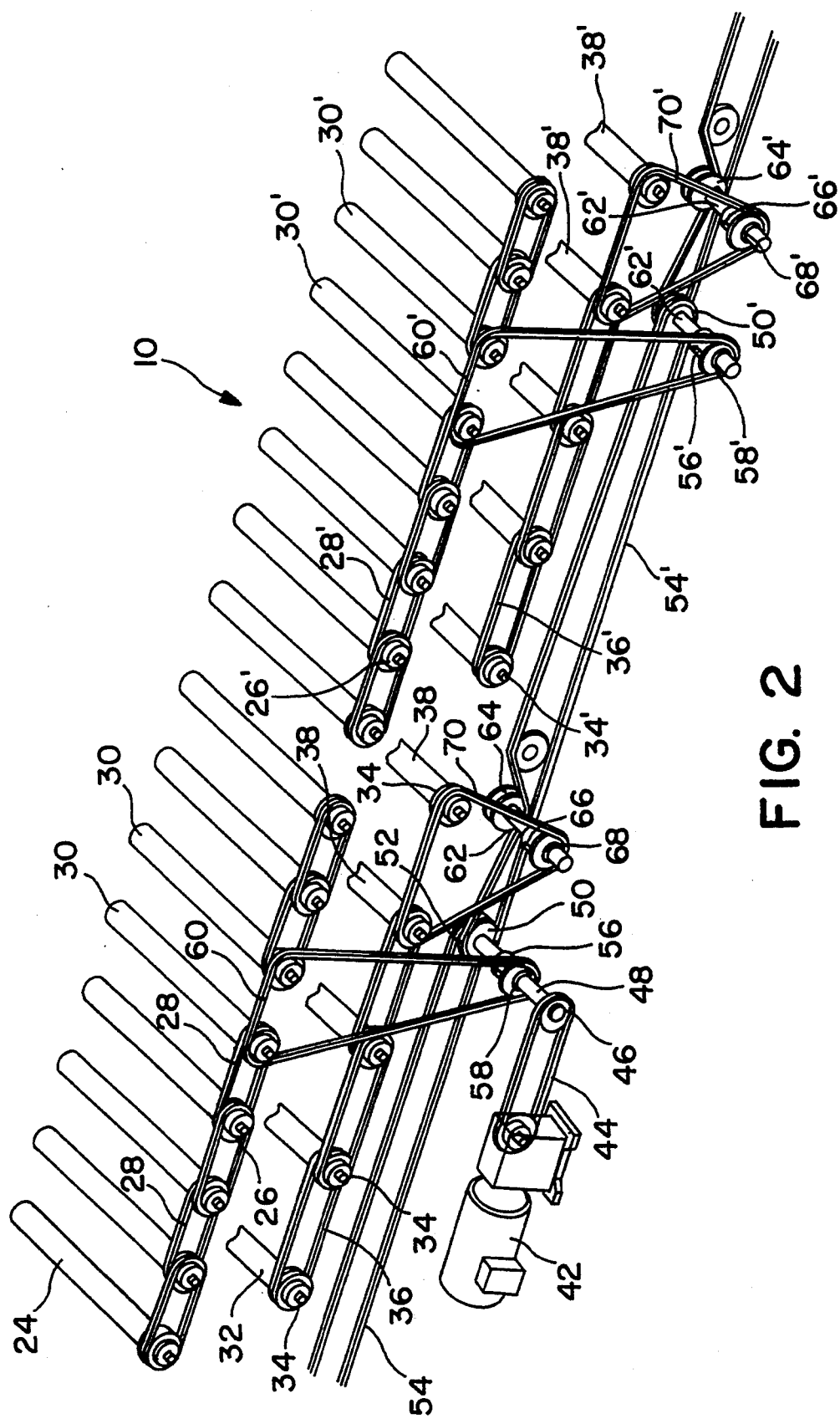
FIG. 2 is a sectional perspective view of two conveyor sections of the accumulation roller conveyor of FIG. 1.

Referring to FIGS. 1 and 2, the accumulation roller conveyor 10 illustrated is comprised of four consecutive conveyor sections 16 connected in end-to-end relation and positioned between combination loading and unloading stations 12 and 14. It will become apparent that as many sections as necessary for a particular installation may be positioned together in end-to-end relation. Each section 16 includes a frame structure 20 including a pair of longitudinally extending transversely connected side frames 22,22'.

Parallel upper load carrying rollers 24, illustrated by groups of eight rollers each although the number may be varied, are supported at their ends between side frames 22,22'. The upper load carrying rollers 24 are arranged in a series of successive groups and are adapted to support pallets on which articles are mounted. Each group has a length sufficient to accommodate one pallet. Adjacent pairs of upper load carrying rollers 24 are drivingly connected to one another by means of a sprocket gear 26 mounted to the end of each roller and in mesh with a driving chain belt 28 looped over each sprocket gear. The upper load carrying rollers 24 in each section 16 are driven by power transmitted through drive rollers 30. Each conveyor section 16 includes a load sensing photoelectric element 31 (FIG. 5) preferably located at the downstream end of each conveyor section next to the last upper load carrying roller so that a load coming onto a particular group will move up to the end of that group before coming to a stop if that group has been conditioned or set to stop.

Parallel lower load carrying rollers 32, illustrated by groups of five rollers each although the number may be varied, are also supported at their ends between side frames 22,22'. The lower load carrying rollers 32 are arranged in a series of successive lower groups each arranged in substantially vertically aligned relation and longitudinally coextensive with a superimposed upper group. The vertical distance between upper load carrying rollers 24 and lower load carrying rollers 32 need only be sufficient to convey an empty pallet on the lower load carrying rollers. Adjacent pairs of lower load carrying rollers 32 are drivingly connected to one another by means of a sprocket gear 34 mounted to the end of each roller and in mesh with a driving chain belt 36 looped over each sprocket gear. The lower load carrying rollers 32 in each section 16 are driven by power transmitted through drive rollers 38. Each lower conveyor section 16 also includes a load sensing roller 40 (FIG. 5) preferably located between the last and next to last load supporting rollers in each group so that a pallet coming onto a particular group of lower load carrying rollers will move up to the end of that group before coming to a stop if that group has been conditioned or set to stop.

With further reference to FIGS. 1 and 2, the rollers 24,32 are driven by power supplied from a single drive unit 42 supported by the frame structure 20. Drive unit 42 includes a motor and reduction gear unit extending longitudinally of the conveyor 10 providing continuous drive through a chain belt 44 looped over sprocket 46. Sprocket 46 is fixed to an input shaft 48 which also has fixed thereto sprocket gears 50,52. The sprocket gear 50 meshes with chain belt 54' looped over a similar sprocket gear 50' mounted on a similar input shaft 58' thereby transferring power to the adjacent conveyor section 16. Sprocket gear 52 is in mesh with a similar chain belt 54 looped over a similar sprocket gear mounted on a similar input shaft thereby transferring power to the next adjacent conveyor station 16 as is readily apparent from FIG. 3.

Figure 4:
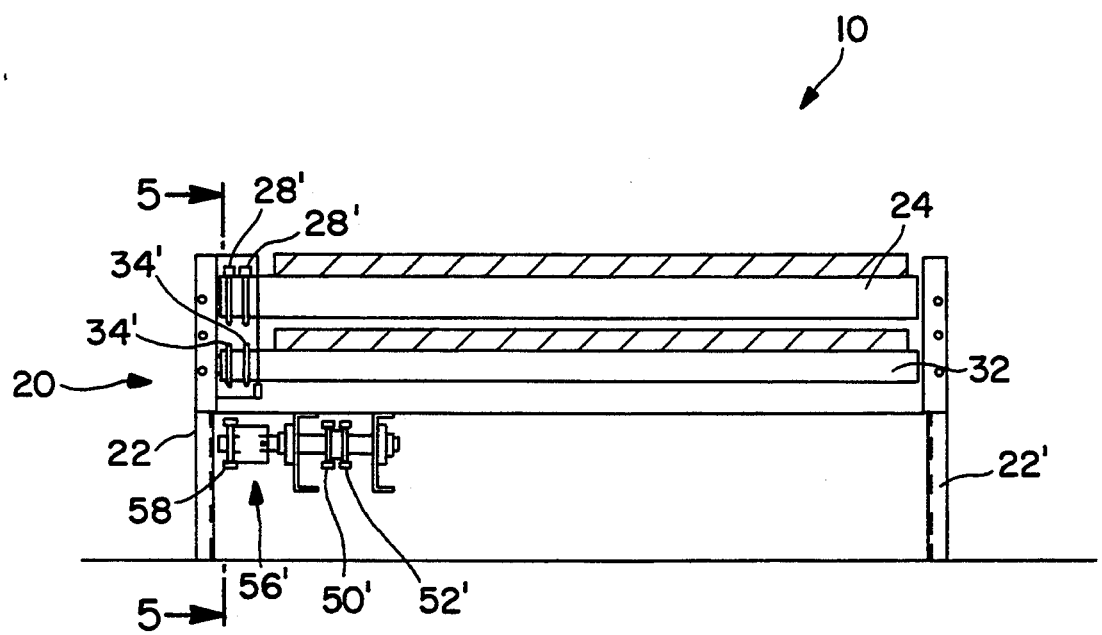
FIG. 4 ms a sectional elevational view of the accumulation roller conveyor taken along lines 4—4 in FIG. 1.
Figure 5:
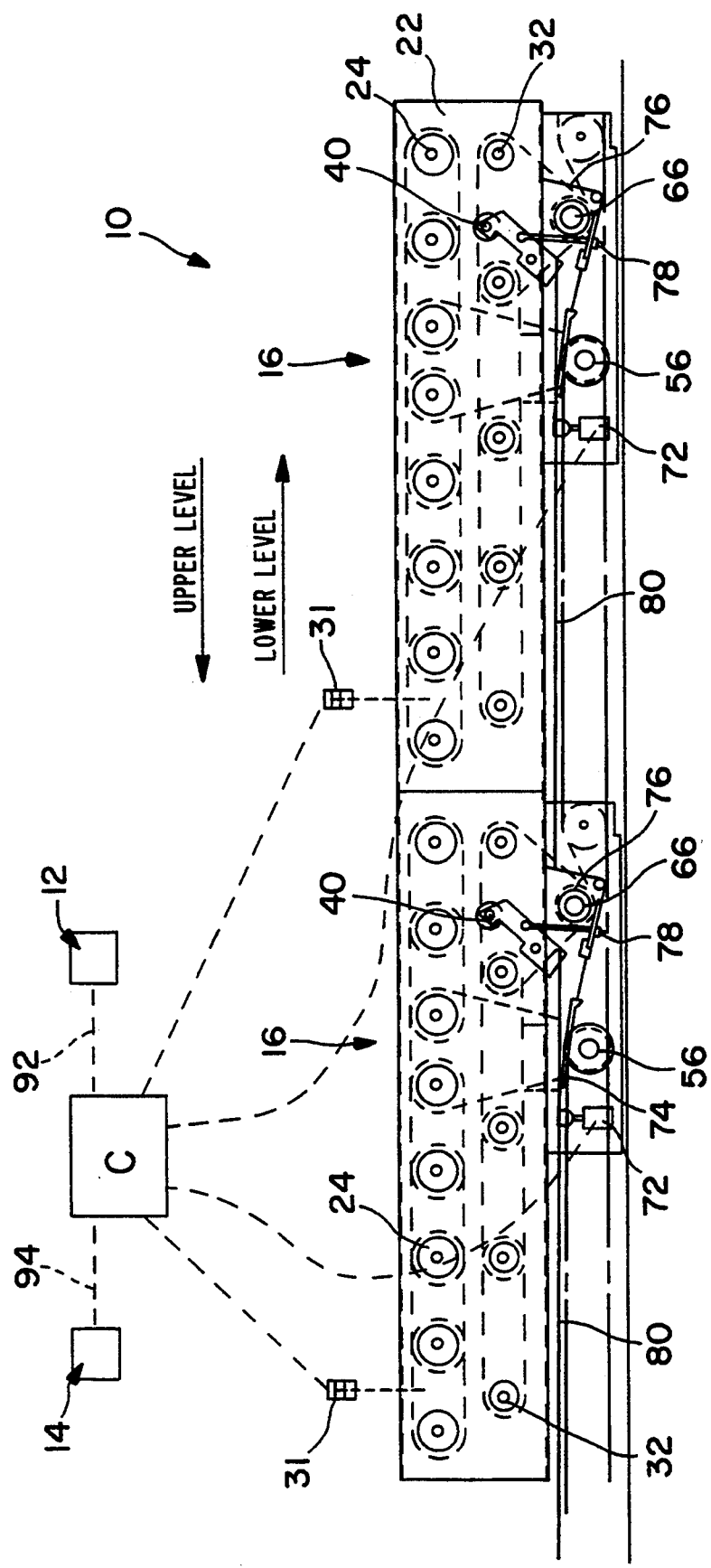
FIG. 5 is an enlarged sectional elevational view of two sections of the accumulation roller conveyor taken along lines 5—5 in FIG. 4 illustrating an end-to-end relationship of consecutive conveyor sections.

With reference to FIGS. 2, 4 and 5, each conveyor section includes a first on-off type clutch 56 drivingly connected to input shaft 48. The output hub of first clutch 56 includes a sprocket gear 58 that drives a chain belt 60 looped over sprocket gears 26 on drive rollers 30 which in turn drive an upper group of load carrying rollers 24 in one direction of rotation whereby articles supported on the upper load carrying rollers are conveyable by successive upper groups of rollers to a terminal upper group at one end of the conveyor 10.

Referring again to FIGS. 1 and 2, each conveyor section 16 includes an idler shaft 62 including a sprocket 64 drivingly connected to chain belt 54. A second on-off type clutch 66 is drivingly connected to idler shaft 62. The output hub of second clutch 66 includes a sprocket gear 68 that drives a chain belt 70 looped over sprocket gears 34 on drive rollers 38 which in turn drive a lower group of load carrying rollers 32 in the opposite direction of rotation to the upper load carrying rollers 24. Thereby pallets supported on the lower load carrying rollers 32 are conveyable by successive lower groups of rollers to a terminal lower group at the opposite end of the conveyor 10.

First and second on-off type clutches 56,66 are commercially available and operable for engaging and disengaging the upper load carrying rollers 24 and lower load carrying rollers 32 respectively.

Each first on-off type clutch 56 includes an electrical solenoid actuator 72 (FIG. 5) electrically activated by a photoelectric element 31 mounted at each conveyor section 16 adjacent upper load carrying rollers 24. With photoelectric element 31 clear the solenoid 72 is extended, raising the clutch actuator 74, and the clutch 56 engaged, is transmitting power to the upper load carrying rollers 24.

First on-off type clutches 56 are engaged when a load moves onto the upper group of load carrying rollers 24. The load is conveyed until it blocks the photoelectric element 31 of the roller group at the discharge end of the conveyor. Photoelectric element 31 will send a signal to a controller C in communication therewith and with the solenoid actuator 72 on clutch 56, disengaging the clutch to stop power transmission to the upper load carrying rollers for that group. When a load is to be conveyed from the upper load carrying rollers of a particular conveyor section 16, the controller energizes the solenoid 72, causing clutch 56 to engage and again drive that group of upper load carrying rollers.

Second on-off type clutch 66 includes a counter-weighted, pivoting actuator 76 that engages the clutch release sleeve on the clutch and is mechanically actuated in response to actuating rods 78 and 80 in communication with the load sensing rollers 40. Actuating rod 80 extends from the actuator 76 of one clutch 66 to the actuator 76 of the next upstream clutch 66 and conditions that upstream clutch for disengagement in response to operation of a load sensing roller 40 associated therewith.

Second on-off clutch 66 is actuated to disengage by actuating rod 76 extending from one end of the load sensing roller 40. A pallet is carried along a group of lower load carrying rollers until it passes over the load sensing roller 40. The pallet causes the load sensing roller 40 to depress to a position where the actuating rod 76 is extended, allowing the clutch actuator 76 to fall into contact with the clutch release sleeve, disengaging the second on-off type clutch 66 to stop power transmission to that group of lower load carrying rollers.

Each time the photoelectric element 31 at the end of conveyor 10 signals the controller C to disengage that group of upper load carrying rollers 24 in response to the presence of a load on the rollers the controller sets the preceding group of upper load carrying rollers to be declutched when a load on the preceding stage moves into view of the associated photoelectric element. Similarly, the presence of a load on sensor roll 40 on the end conveyor section 16 group of lower load carrying rolls will extend actuator rod 78 set the actuator 80 for declutching when a pallet moves onto the load sensing roller 40 for the respective preceding conveyor section 16.

The combination loading and unloading stations 12 and 14 mounted at each end of conveyor 10 are lifting devices that include a plurality of load carrying rollers 82 (FIG. 3) extending between side frame members 84,84' (FIG. 1) mounting the rollers. A pivotable linkage assembly 86 connected to frame members 84,84' is movable through the actuation of a pneumatic actuator 88. Stations 12 and 14 transfer pallets between the upper and lower groups of load carrying rollers 24,32, respectively providing automated pallet management as hereafter more fully described. Sensing elements associated with these stations provide signals through connections 92 and 94 to the controller C to indicate their position and their loaded or unloaded condition.

OPERATION OF THE INVENTION

Figure 3:
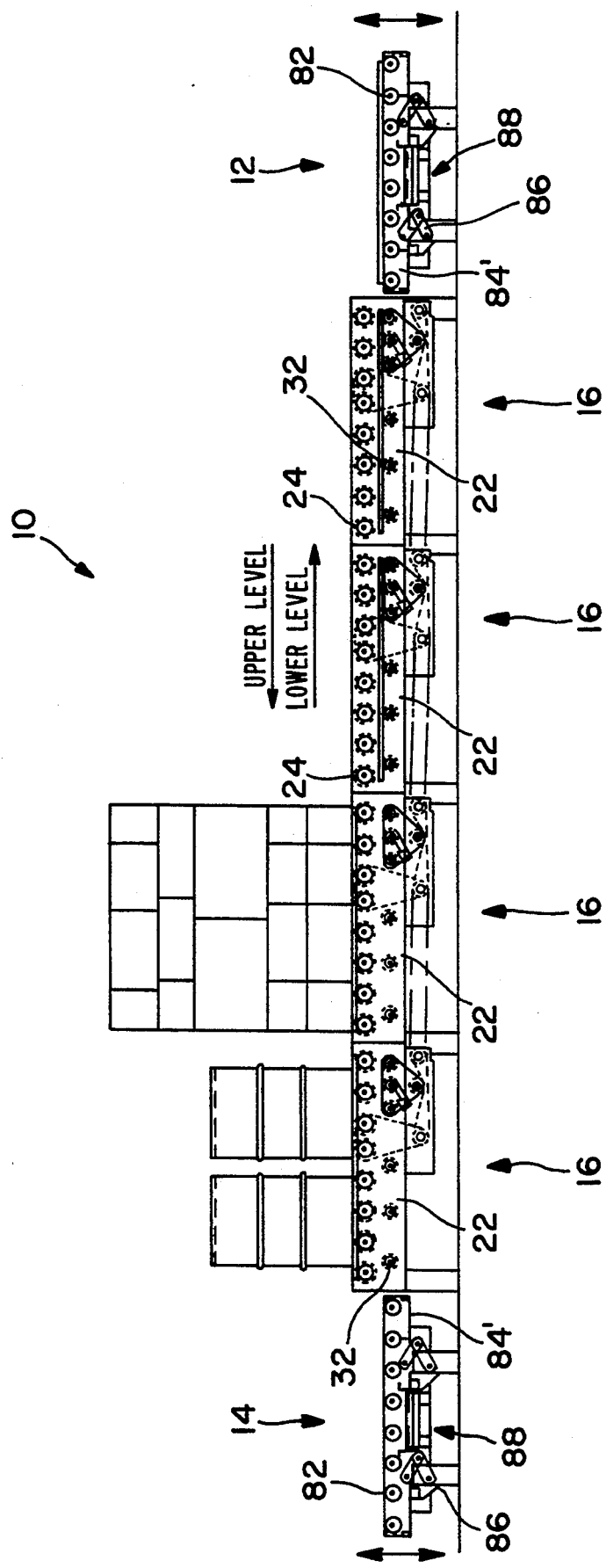
FIG. 3 is a sectional elevational view of the accumulation roller conveyor taken along lines 3—3 in FIG. 1.

Referring to FIGS. 1 and 3, a load moves without interruption, from right to left on the upper groups of load carrying rollers 24 as pallets move from left to right on the lower groups of load carrying rollers 32. At each end of the conveyor 10, combination loading and unloading stations 12 and 14 are available and operable for lifting and lowering pallets so they can be exchanged between the upper and lower groups of load carrying rollers 24,32. When the combination loading and unloading station 12 at the loading end of the conveyor 10 is in a raised position, a pallet on the station is available to receive a load. A fork lift (not shown) typically deposits a load on the pallet and leaves the area of the combination loading and unloading station 12. Combination loading and unloading station 12 conveys the loaded pallet onto the group of upper load carrying rollers 24 of the first conveyor section 16 adjacent the combination loading and unloading station and the loaded pallet is conveyed toward the combination loading and unloading station 14 at the opposite unloading end of the conveyor.

At the unloading end of the conveyor 10, the combination loading and unloading station 14 includes a detection element in communication with the controller for the preceding conveyor section 16. The detection element signals the preceding conveyor section 16 to cause the clutch 56 to disengage the group of upper load carrying rollers 24 for that conveyor section and brake the rollers to stop the associated load so that the load on the combination loading and unloading station 14 can be removed from the conveyor. Concurrently, the group of lower load carrying rollers 32 for the end conveyor section 16 and the upper and lower groups of load carrying rollers 24,32 for the preceding conveyor section are set to stop when the corresponding photoelectric element 31 or load detecting roller detects a corresponding load or pallet respectively.

When the load is removed from the combination loading and unloading station 14 the last conveyor section 16 and its associated first on-off type clutch 56 is engaged to convey the next load onto the combination loading and unloading station. In the same operation, the last conveyor section 16 receives the next load from the preceding conveyor section as becomes readily apparent. The combination loading and unloading station 14 at the unloading end of conveyor 10 lowers the empty pallet through vertical displacement initiated by the pivotable linkage assembly and pneumatic actuator to the horizontal level of the groups of lower load carrying rollers 32 so the empty pallet can be conveyed back to the combination loading and unloading station at the beginning of the conveyor. The system manages pallet flow by establishing a continuous loop of conveyable pallets utilizing a fixed number of pallets for any accumulation conveyor sections and pallet spacing setting, thereby improving the conveyability of pallet loads.

While the above invention has been described in terms of bi-directional over and under accumulation roller including conveyor sections 16 in end-to-end relation with a combination loading and unloading station 12 and 14 at either end, it will be appreciated by on skilled in the art that in alternative embodiments a transfer car or carousel can be included in the system to take advantage of the improved conveyability provided by the invention.

While the best mode for carrying out the invention has been described in detail, those familiar with the art to which this invention relates will recognize various alternative embodiments for practicing the invention as defined by the following claims.

What is claimed is:

1. A bi-directional accumulation roller conveyor comprising:
   a frame structure including a pair of longitudinally extending transversely connected side frames;
   a first plurality of parallel upper load carrying rollers supported between said side frames, said upper load carrying rollers being arranged in a series of successive upper groups, each of said upper groups having a driving connection between the rollers thereof;
   a second plurality of parallel lower load carrying rollers supported between said side frames below said upper load carrying rollers, said lower load carrying rollers being arranged in a series of successive lower groups each having a driving connection between the rollers thereof;
   a drive unit supported by said frame structure;
   driving means extending from said drive unit to each of said upper groups and to each of said lower groups for driving the rollers of said upper groups in one direction of rotation and the rollers of said lower groups in the opposite direction of rotation whereby articles supported on said upper load carrying rollers are conveyable by successive upper groups to a terminal upper group at one end of the conveyor and articles supported on said lower load carrying rollers are conveyable by successive lower groups to a terminal lower group at the opposite end of the conveyor;
   said driving means including for each of said series of upper and lower groups a respective series of upper and lower drive trains, each drive train including clutch means therein for selective engagement and disengagement thereof; and upper and lower accumulation means for disengaging said clutch means of said drive trains of said upper groups and said lower groups respectively in response to the presence of an article on each of said terminal upper and lower groups and on successive groups upstream from each of said terminal upper and lower groups.

2. A bi-directional accumulation roller conveyor according to claim 1 wherein said upper groups and said lower groups are arranged in substantially vertically aligned relation, each lower group being longitudinally co-extensive with a superimposed upper group.

3. A bi-directional accumulation roller conveyor according to claim 2 wherein said upper load carrying rollers are adapted to support pallets on which articles are mounted, each of said upper groups having a length such as to accommodate one pallet, and said lower load carrying rollers are spaced below said upper load carrying rollers a vertical distance sufficient only for the support of empty ones of said pallets on said lower load carrying rollers.

4. A bi-directional accumulation roller conveyor according to claim 3 wherein said driving means comprises drive transmission means connected to said drive unit and extending longitudinally of said conveyor, each of said drive trains includes a transversely extending drive shaft rotatably supported by said frame, a drive receiving member on each of said drive shafts engaged by said drive transmission means and means for reverse direction rotational engagement of said drive receiving members of one of said series of upper and lower drive trains by said drive transmission means.

5. A bi-directional accumulation roller conveyor according to claim 4 wherein said drive transmission means comprises an endless drive transmitting member, and said means for reverse direction rotational engagement of said drive receiving members of one of said upper and lower series of drive trains comprises a training element carried by said frame structure adjacent to each drive receiving member of such one series and engaged by said drive transmitting members.

6. A bi-directional accumulation roller conveyor according to claim 4 wherein said drive transmission means comprises a series of endless drive transmitting members arranged in end-to-end relation in successive engagement with drive receiving members on the drive shafts of one of said upper and lower series of drive trains, each of said endless drive transmitting members having a portion connected by said transmission means into reverse direction rotational engagement with the drive receiving members on a drive shaft of the other of said upper and lower series of drive trains.

7. A bi-directional accumulation roller conveyor according to claim 6 wherein said endless drive transmitting members connect the drive shafts of the drive trains of adjacent roller groups of one of said upper and lower series of drive trains.

8. A bi-directional accumulation roller conveyor according to claim 1 further comprising:
a lifting device including a plurality of load carrying rollers and longitudinally extending side frame members mounting said rollers;
lifting means connected to said side frame members for vertically displacing said plurality of load carrying rollers between elevations defined by said upper load carrying rollers and said lower load carrying rollers whereby articles can be raised and lowered to be transferred between said upper and lower load carrying rollers.

9. A bi-directional accumulation roller conveyor according to claim 8 wherein said lifting device is integral with said roller conveyor.

10. A bi-directional accumulation roller conveyor according to claim 8 wherein said lifting means includes a pivotable linkage assembly and hydraulic actuator.

11. A bi-directional accumulation roller conveyor as in claim 1 wherein said upper accumulation means includes a photoelectric element mounted above said upper load carrying rollers for sensing the presence of a load on said upper load carrying rollers, and an electrical solenoid actuator in communication with said photoelectric element and said clutch means for said upper drive train.

12. A bi-directional accumulation roller conveyor as in claim 11 further including a controller in communication with said photoelectric element and said electrical solenoid actuation for controlling accumulations.

* * * * *